United States Patent [19]

Kurahashi et al.

[11] Patent Number: 4,982,291
[45] Date of Patent: Jan. 1, 1991

[54] ELECTRONIC STILL VIDEO CAMERA CAPABLE OF SEARCHING DESIRED PICTURE IN SIMPLE AND QUICK MANNER

[75] Inventors: Shigeki Kurahashi, Akishima; Hiroshi Okumura, Tokyo, both of Japan

[73] Assignee: Casio Computer Co., Ltd., Tokyo, Japan

[21] Appl. No.: 235,986

[22] Filed: Aug. 23, 1988

[30] Foreign Application Priority Data

Aug. 27, 1987 [JP] Japan .................. 62-130440[U]
Jun. 23, 1988 [JP] Japan .................. 63-155347
Jun. 23, 1988 [JP] Japan .................. 63-155348
Jun. 23, 1988 [JP] Japan .................. 62-83327[U]

[51] Int. Cl.⁵ .................................. H04N 5/781
[52] U.S. Cl. .................................. 358/335; 358/906; 360/33.1
[58] Field of Search .............. 358/335, 906, 909; 360/33.1, 35.1

[56] References Cited

U.S. PATENT DOCUMENTS

| | | |
|---|---|---|
| 4,057,830 | 11/1977 | Adcock . |
| 4,163,256 | 7/1979 | Adcock . |
| 4,366,501 | 12/1982 | Tsunekawa et al. . |
| 4,420,773 | 12/1983 | Toyoda et al. ............ 358/906 |
| 4,456,931 | 6/1984 | Toyoda et al. ............ 358/906 |
| 4,555,803 | 11/1985 | Hirose ..................... 358/335 |
| 4,558,368 | 12/1985 | Aoki et al. ................ 358/906 |
| 4,573,084 | 2/1986 | Iida .......................... 360/35.1 |
| 4,599,657 | 7/1986 | Kinoshita . |
| 4,675,755 | 6/1987 | Baumeister et al. ....... 360/35.1 |
| 4,783,707 | 11/1988 | Nemoto et al. . |
| 4,802,018 | 1/1989 | Tanikawa et al. .......... 358/335 |
| 4,802,019 | 1/1989 | Harada et al. ............. 358/335 |

FOREIGN PATENT DOCUMENTS 0186883 12/1985 European Pat. Off. .

*Primary Examiner*—Donald McElheny, Jr.
*Attorney, Agent, or Firm*—Frishauf, Holtz, Goodman & Woodward

[57] ABSTRACT

An electronic still video camera comprises a floppy disk for recording a plurality of still pictures, an entry unit for entering a file name and also a disk number for the above-described floppy disk, a setting unit for setting a continuous picture mode, a mode changing switch for setting a recording mode, and a memory for storing a recording track number of the floppy disk. In the electronic still video camera, the recording track numbers of the still pictures which have been taken while entering the file name, setting the continuous-exposure mode, and setting the recording mode, are recorded in the above-described memory, whereas the reproduction track of the floppy disk is controlled in accordance with the memory content of the memory during the reproduction.

14 Claims, 7 Drawing Sheets

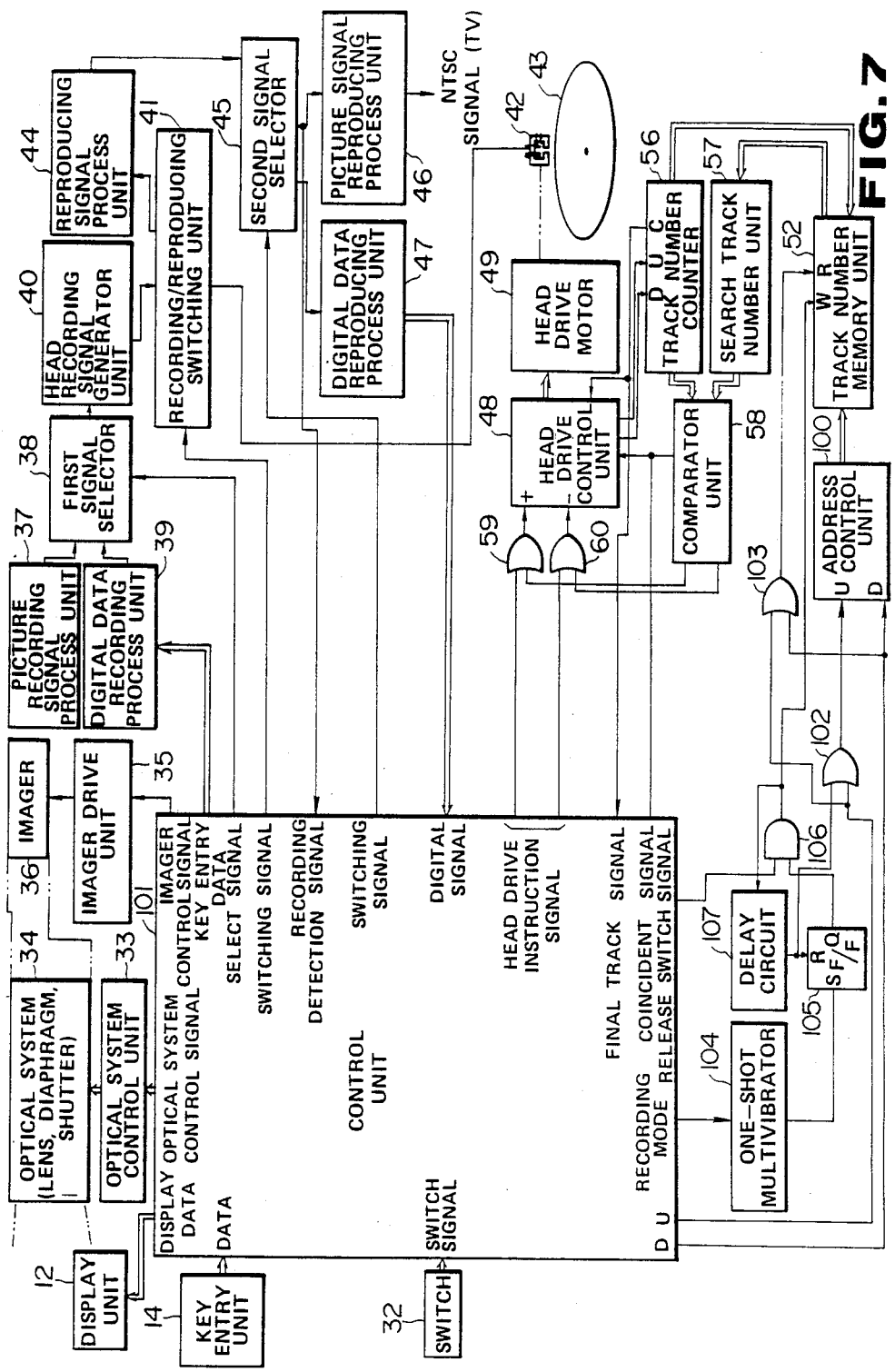

ELECTRONIC STILL VIDEO CAMERA CAPABLE OF SEARCHING DESIRED PICTURE IN SIMPLE AND QUICK MANNER

BACKGROUND OF THE INVENTION

1. Field of the Invention

The present invention relates to an electronic still video camera capable of converting an optical image focused through a lens on an imager into a corresponding electrical signal as a still picture image, and recording the still picture image signal on a magnetic disk.

2. Description of the Related Art

Very recently, practical attempts of a so-called "electronic still video camera" have been made in which an optical image focused through a lens is converted by an imaging element such as a charge-coupled device (CCD) into a corresponding electrical signal, and the converted electrical signal is recorded on a magnetic disk, as a still picture data.

In general, in such an electronic still video camera, a picture signal adapted for the NTSC (National Television System Committee) system is produced from the still picture signal derived from the imaging element, and then recorded on a 2-inch sized floppy disk. In the recording format of the electronic still video camera, one still picture data is stored on one track of the floppy disk when a single still picture is obtained as a 1-field television signal, whereas one still picture data is recorded on two tracks of the floppy disk when a single still picture is obtained as a 1-frame television signal.

Normally, the floppy disk contains 50 lines of the recording track capable of recording the still picture data thereon. Accordingly, one floppy disk can record 50 sheets of the still pictures if the field recording format is employed, whereas it can record 25 sheets of the still pictures if the frame recording format is employed.

As one of the features of the electronic still video camera, the still pictures (data) recorded on the floppy disk can be printed out by utilizing a hard-copy printer, and furthermore can be reproduced on a television monitor.

In the above-described conventional electronic still video camera, the still picture must be reproduced one by one on the television monitor when recorded still picture data are reproduced. As a consequence, highly cumbersome retrieval operations are required so as to reproduce the specific still picture on the television monitor. More specifically, if the still picture data have been recorded in the field-recording format, such cumbersome retrieval operations to the desired still picture are remarkable since 50 sheets of the still pictures can be recorded on a single floppy disk.

SUMMARY OF THE INVENTION

The present invention has been made in consideration to the above-described conventional drawbacks inherent to the electronic still video camera, and has therefore an object to provide an electronic still video camera wherein the desired still picture can be readily searched within a short time period from a plurality of still pictures recorded on the floppy disk and also reproduced on a television monitor.

The object and other features of the invention are accomplished by providing electronic still image recording apparatus comprising:

release means for generating a release signal;

still image signal producing means for producing an electric still image signal from an optical image of an object to be imaged in response to said release signal generated by said release means;

recording means capable of recording a plurality of said electric still image signals generated according to a plurality of said optical images;

index data memory means for storing index data that indicates a portion of said recording means at which said electric still image signals are recorded;

still image signal reproducing means for reproducing said electric still image signals recorded on said portion of said recording means; and, control means for controlling said still image signal reproducing means based upon said index data recorded on said memory means, whereby said electric still image signal recorded on said portion and designated by said index data is reproduced With the above-described circuit arrangements, the electronic still video camera according to the invention can very easily search the desired still picture within a short time period when a plenty of the still pictures recorded on the floppy disk are reproduced. Accordingly, the improved camera operation can be realized.

BRIEF DESCRIPTION OF THE DRAWINGS

The above purpose and other useful and novel features of the present invention will become more readily apparent in the following description of the accompanying drawings, in which.

DETAILED DESCRIPTION OF THE PREFERRED EMBODIMENT

General Description of Electronic Still Video Camera

Figure 1:
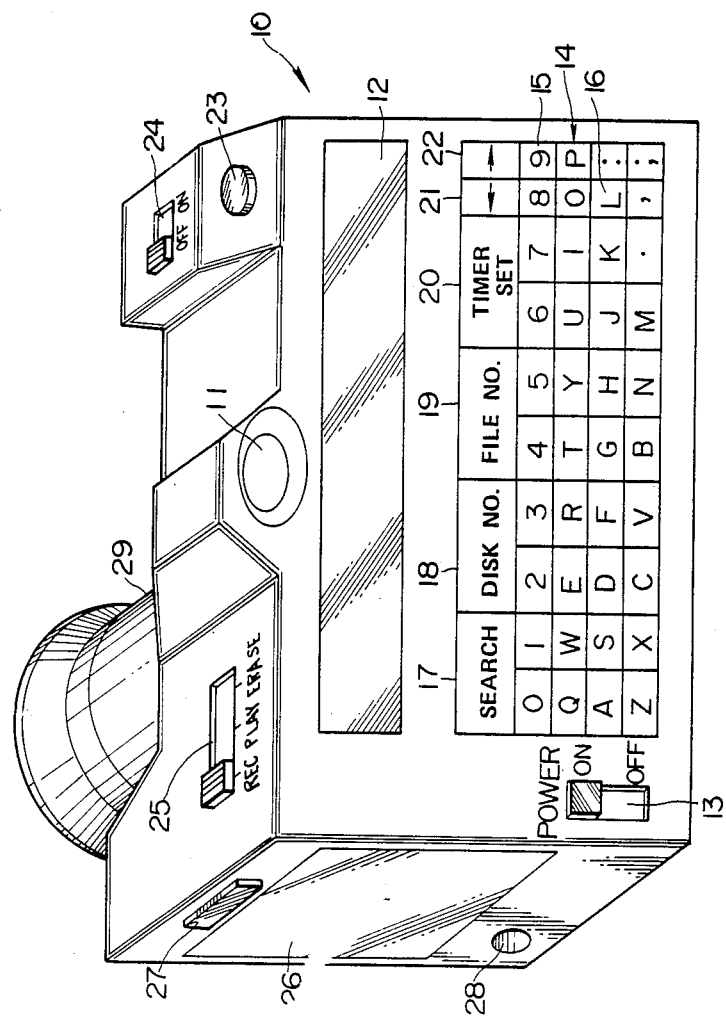
FIG. 1 is a perspective view of an electronic still video camera according to a preferred embodiment of the invention.

Referring now to an outer view of an electronic still video camera according to a first preferred embodiment of the present invention, as illustrated in FIG. 1, various functions of the electronic still video camera will be described.

A main body of the electronic still video camera is denoted by reference numeral 10 in FIG. 1. On a rear surface of the camera body 10, there are provided a finder 11, a liquid crystal display unit 12, a power switch 13, and a key entry (input) unit 14.

Function of the above-described liquid crystal display unit 12 are to display a shutter speed, camera conditions such as a mode display, and various data entered from the above-described key entry unit 14. The key entry unit 14 is to enter various data, and is arranged by numeral keys 15, alphabet keys 16, a search key 17, a disk-number setting key 18, a file-name entering key 19, a timer setting key 20, and instruction keys for cursor/-track movement 21, 22. The above-described search key 17 is operated when the recording/reproducing tracks of the floppy disk (will be described later) are designated. Also, the above-described disk number setting key 18 is used while the disk number for the inserted floppy disk is set. The above-described file-name entering key 19 is employed so as to set the file name to the still picture to be recorded, and also entry the file name when the presetting file name is designated during the reproduction. The timer set key 20 is utilized to set the reproduction time required for the respective still pictures while continuously reproducing the still pictures which have been continuously exposed by the still video camera. Moreover the above-described cursor/-track movement instruction keys 21 and 22 are used when the movement of the cursor displayed o the above-described display unit 12 is instructed during the data entry, or when the recording track and reproducing track are sequentially updated.

On an upper surface of the above-described camera body 10, there are provided a release switch 23, a continuous exposure mode switch 24 for turning on/off the continuous-exposure mode, and a main mode switch 25 for changing the respective recording, reproducing and erasing modes. On the left side of the still video camera shown in FIG. 1, a TV (television) signal output terminal 28 is mounted to output a picture (video) signal to a television receiver (not shown), and an eject button 27 is mounted so as to eject the floppy disk which has been inserted into an insertion part 26 for the floppy disk. A lens 29 is mounted on a front surface of the camera body 10.

Intenal Circuit of Electronic Still Video Camera

Figure 2:
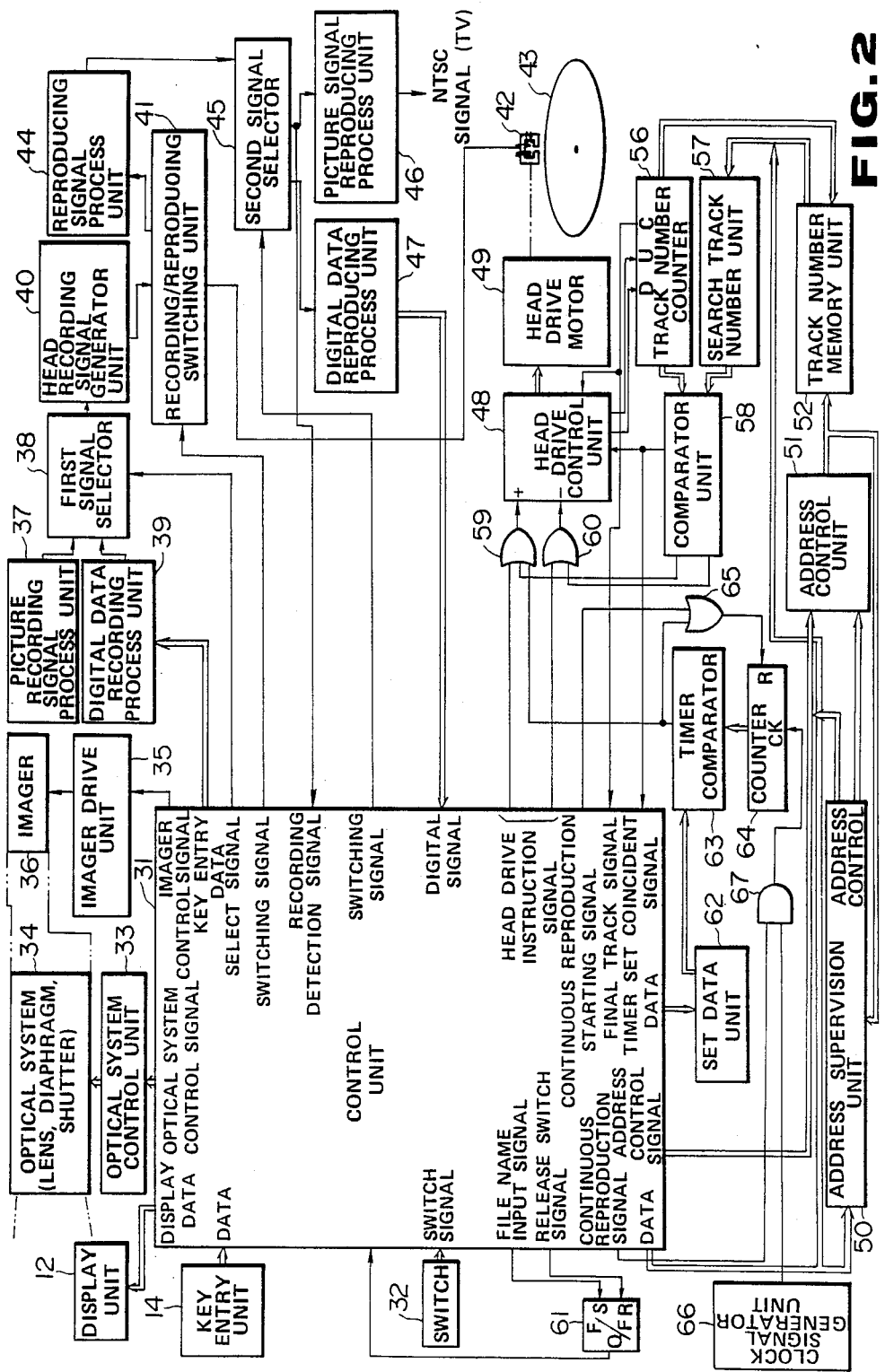
FIG. 2 is a schematic block diagram of a circuit arrangement of the electronic still video camera illustrated in FIG. 1.

FIG. 2 is a circuit diagram of an electronic circuit of the above-described electronic still video camera. In the circuit diagram of FIG. 2, a control unit 31 is employed to which the switch unit 32 consisting of the various switches 13, 24, 25 and 26 provided on the above-mentioned camera body 10 is connected. Also, the key entry unit 12 is connected to this control unit 10. In response to input signals derived from this switch unit 32 and key entry unit 12, the entire operation of this electronic circuit is controllable.

An optical system 34 arranged by an imaging lens, a diaphragm, and a shutter (not shown in detail) is connected via an optical system control unit 33 to the control unit 31. Also, an imager 36 constructed of a solid-state imaging element such as a CCD (charge-coupled device) and MOS (metal-oxide semiconductor) transistor is connected via an imager driving unit 36. Then a still picture (image) imaged via the optical system 34 onto the imager 36 is transferred to an imager recording signal process unit 37.

The major function of the image recording signal process unit 37 is to produce a (Y+S) signal which is obtained by adding a horizontal sync signal to a luminance signal, and color difference signals (R-Y) and (B-Y) from an image signal output from the imager 36. Moreover, after the above-described color difference signals (R-Y) and (B-Y) are sequential-scanned, the above-described luminance signal (Y+S) and the sequential-scanned color difference signals (R-Y) and (B-Y) are respectively frequency-modulated and thereafter synthesized with each other. Then, the image signal output from the image recording signal process unit 37 is supplied to a first signal selector 38 which is operated in response to a select signal from the control unit 31.

To this signal selector 38, digital data such as disk number data which is input by operating the key entry input unit 14 is supplied via a digital data recording process unit 39. Either the picture signal which is selected by this signal selector 38, or digital data is output to a head 42 via a head recording signal generator unit 40 having an amplifier and a recording/reproducing switching unit 41. As a result, the writing and recording operations of the picture signal and digital data derived from the magnetic head 42 can be accomplished for the floppy disk 43.

The above-described floppy disk 43 contains 50 tracks on which the picture signal corresponding to a 1-field signal of a television picture signal can be recorded, and also a single queue track capable of recording digital data such as a disk number and so on.

Reproducing Mode

In the reproducing mode, the picture signal recorded on the floppy disk 43 is reproduced by means of the magnetic head 42, and thereafter the reproduced picture signal is transferred via the recording/reproducing switching unit 41 to the control unit 31 and a reproducing signal process unit 44. The major function of this reproducing signal process unit 44 is to separate the image signal obtained from this floppy disk 43 into the luminance signal (Y+S) and color difference signals (R-Y), (B-Y) and then frequency-modulate these signals. Then, the demodulated picture signal from this reproducing signal process unit 46 is output, as an NTSC system television signal, to the TV output terminal 28 (see FIG. 1) via the second signal selector 45 and picture signal reproducing process unit 46. When the signal read out from the above-described floppy disk 43 at the reproducing signal process unit 44 corresponds to digital data which have been recorded on the queue track of the floppy disk 43, this signal is transferred from the second signal selector 45 via the digital data reproducing process unit 47 to the control unit 31.

The above-described magnetic head 42 is, on the other hand, connected to a head drive motor 49 which is controlled by a head drive control unit 48. The magnetic head 42 is moved in a radial direction of the floppy disk 43 so that the signal recording/reproducing operation can be correctly performed on a predetermined track of the floppy disk 43.

File name data and also disk number data entered by means of the above-described key entry unit 14 are input via the control unit 31 to an address supervision unit 50. Also, continuous-exposure file number data which are set in accordance with the designation of the continuous-exposure mode during the recording mode, are similarly entered via the control unit 31 to the address supervision unit 50. The address supervision unit 50 delivers the address data and control signal to the address control unit 51 so as to control addressing operations of the address control unit 51.

This address control unit 51 is under the control of the above-described address supervision unit 50 and control unit 31. The address control unit 51 addresses a memory (not shown) employed in the address supervision unit 51 and a track number memory unit 52, and also outputs address data to the above-mentioned memory provided in the address supervision unit 50 for storing the data therein.

Circuit Arrangement of Address Supervision Unit

Figure 3:
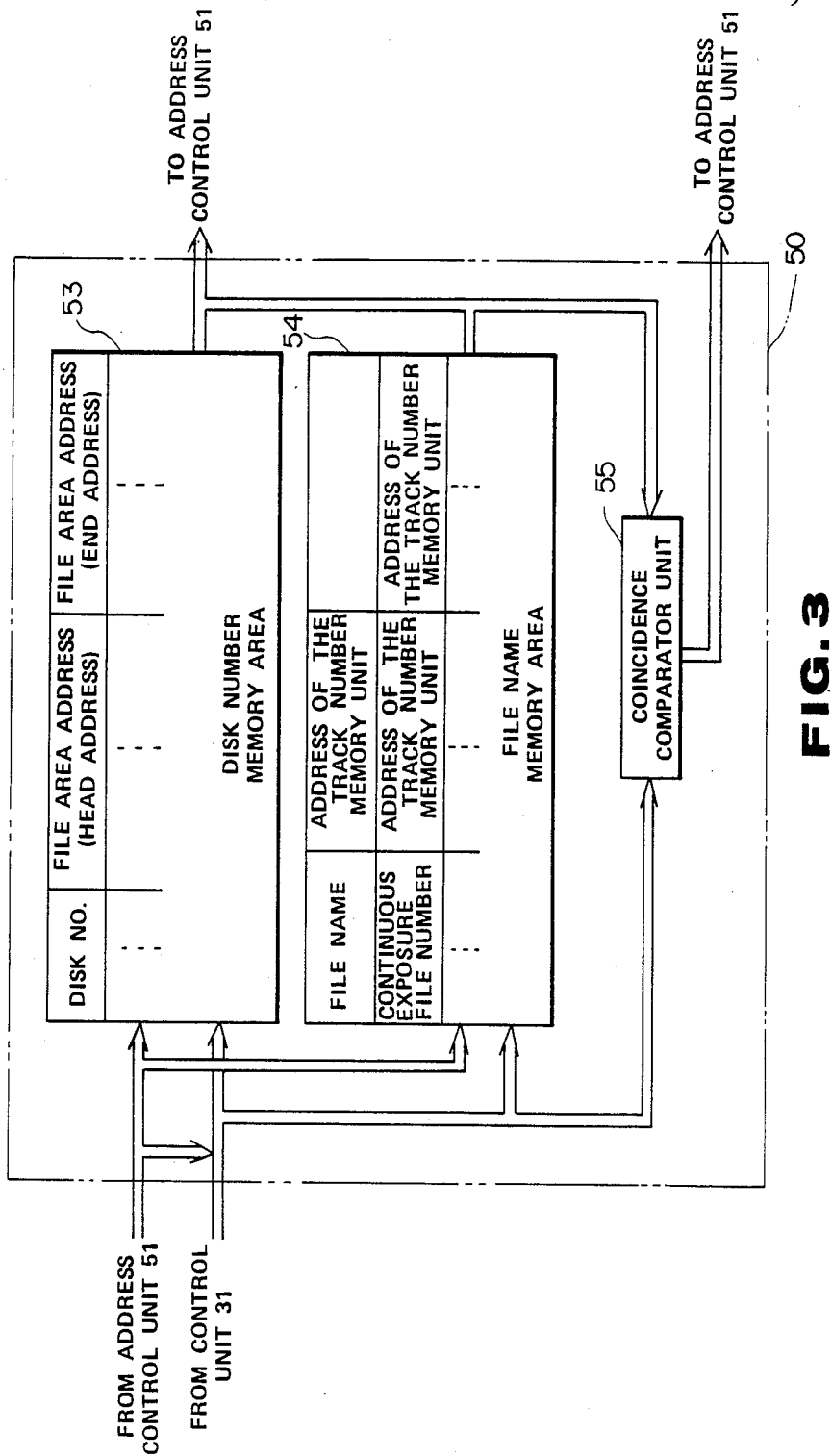
FIG. 3 is a schematic block diagram of a circuit arrangement of the address supervising unit shown in FIG. 2.

Referring now to FIG. 3, a detailed circuit of the above-described address supervision unit 50 will be described.

The before-mentioned address supervision unit 50 comprises a disk number memory area 53, a file name memory area 54, and a coincidence comparator unit 55. The dish number memory area 53 is addressed under the control of the address control unit 51, and has a function to store the disk numbers output from the control unit 31 and the address values of the file name memory area output from the address control unit 51. That is, this disk number memory area 53 stores the disk number set to a single disk, the file number set to the still picture recorded on this single disk, or head and final (end) addresses of the file name memory area 54 where the continuous-exposure file numbers have been stored. It should be noted that the control unit 31 updates the continuous-exposure file number every time the continuous-exposure mode is set during the recording mode.

The file name memory area 54 is addressed under the control of the address control unit 51, which is similar to the functions of the above-described disk number memory area 53, so as to store either the file name, or continuous-exposure file number output from the control unit 31, and also address values output from the address control unit 51. Specifically, in the file name memory area 54, there are stored either the file name set by the key entry unit 14 or the continuous-exposure file number set in accordance with the designation of the continuous-exposure mode, and also the address value of the track number memory unit 52 where the track number of the floppy disk 43 has been stored on which track the still picture is recorded when the above-described file name or continuous-exposure file number is set.

It is determined that the above-described file name memory area 54 stores only the address value of the recording track number for the still picture which is firstly taken after the file name is preset when the file name is set, and also the address numbers of the recording tracks for the still pictures which are taken in the beginning and final during the continuous-exposure mode when the continuous-exposure mode is set.

The above-described coincidence comparator unit 55 will compare the disk number read out from the floppy disk 43 during the reproducing mode, the file name entered by the key entry unit 14, or the continuous-exposure file number with the disk number, file name, or continuous-exposure file number read out from the disk number memory area 53 or file name memory area 54. Then, the coincidence comparator unit 55 outputs an address updating command to the control unit 51 in accordance with its comparison result. In other words, the coincident comparator unit 55 sets the addressing range of the file name memory area 54 in response to the disk number read out from the floppy disk 43 during the reproducing mode, and operates so as to set the designate address of the track number memory unit 52 in accordance with either the file name entered by the key entry unit 14 or the continuous-picture file number.

In the track number memory unit 52, on the other hand, the following data are stored. That is, during the recording mode, the track number which is first recorded after the file name is designated, and the track numbers which are recorded at the first and last instants while the picture recording is carried out in the continuous-exposure mode. This track number memory unit 52 is connected to a track number counter 56 and a search track number memory unit 57 (see FIG. 2).

The track number counter 56 increments (counts up), or decrements (counts down) its count value in response to a head drive signal supplied from the head drive control unit 48, so that the recording/reproducing track numbers in the floppy disk 43 are obtained. To the search track number memory unit 57, the search track number input from the key entry unit 14, or the track number output from the track number memory unit 52 is input. Then, the track numbers which have been stored in the track number counter 56 and search track number memory unit 57 are output to the comparator unit 58.

This comparator unit 58 compares the track number output from the track number counter 56 with the track number from search track number memory unit 57, and outputs the head drive command signal via OR-gates 59, 60 to the head drive control unit 48 based upon its comparison result. When the comparison result of these track numbers is coincident with each other, the comparator unit 58 outputs the coincident signal to the control unit 31 and head drive control unit 48. If the comparison result is not coincident, namely the track number supplied from the search track number memory unit 57 is greater than that supplied from the track number counter 56, the comparator unit 58 outputs a command signal for moving the head in the minus (−) direction. Conversely, if the track number of the search track number memory unit 57 is smaller than that supplied from the track number counter 56, the comparator unit 58 outputs another command signal for moving the head in the plus (+) direction. Then the comparator unit 58 outputs an coincidence signal when the coincident comparison result if obtained.

A flip-flop 61 is connected to the control unit 31. This flip-flop 61 is set during the recording mode when the file name is entered, whereas it is reset when a release switch 23 is operated. Accordingly, this control unit 31 performs the writing control of the contents of the track number counter 56 into the track number memory unit 52 under the condition that the flip-flop 61 is set and the release switch 23 is operated.

A reproducing time interval of continuous-exposure data which is set by means of the key entry unit 14 and its timer set key 120, is stored into a set data memory unit 62 via the control unit 31. The reproducing time interval data which has been stored in this set data memory unit 62 is then supplied to a timer comparator unit 63 in which it is compared with the count data derived from the counter 64. This counter 64 is reset during the reproduction of the continuous-exposure data by a continuous reproduction starting signal supplied via a OR-gate 65 from the control unit 31 and also the coincident signal derived from the comparator 63. Also, the counter 64 performs its counting operation upon receipt of a clock signal supplied via an AND gate 67 from a clock signal generator unit 66. When this count data is coincident with the above-described reproduction time interval data while compared in the timer comparator unit 63, the coincident signal is supplied to the head drive control unit 48 as the movement signal of plus (+) for the disk reproduction track via the OR-gate 59. In other words, during the reproduction of the continuous-exposure data, the magnetic head 42 is first moved to a continuous-exposure head track of the floppy disk 43, and thereafter, the magnetic track 42 is sequentially moved by one track up to a continuous-exposure final track of the floppy disk 43 in the plus (+) direction based upon the reproduction time interval set in the set data memory unit 62.

Disk Insertion Operation

Various operations of the electronic still video camera with the above-described circuit arrangement will now be described.

Figure 4:
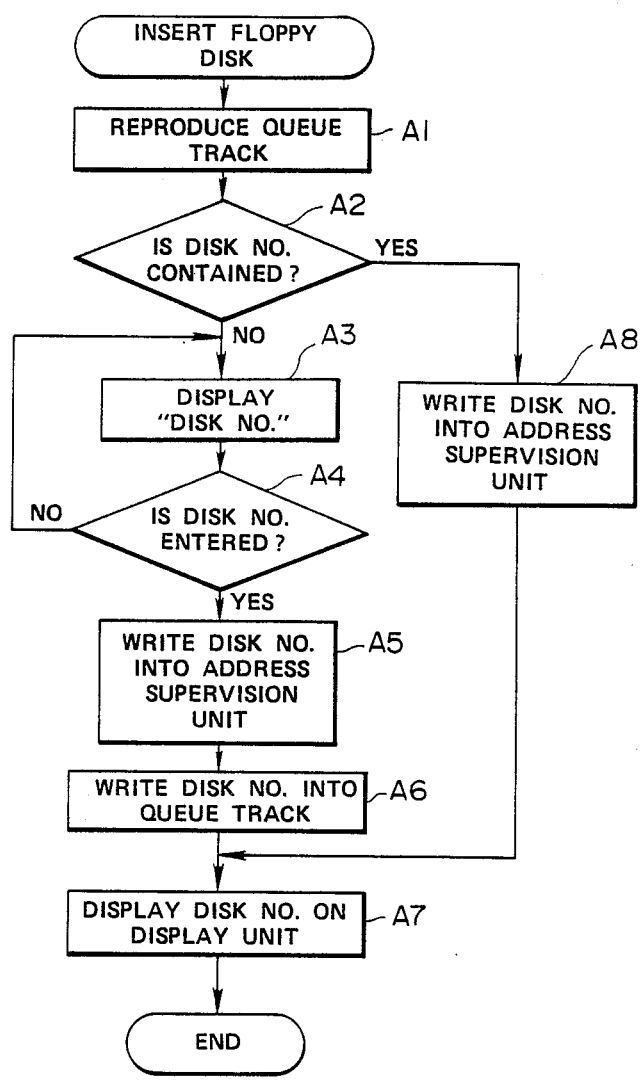
FIG. 4 is a flowchart for explaining a processing operation when the floppy disk is loaded on the electronic still video camera shown in FIG. 1.

First, a control process for inserting a floppy disk into the electronic still video camera will now be explained with reference to a flowchart of FIG. 4.

When the floppy disk 43 is inserted into, or loaded onto the floppy disk insertion unit 26, the control unit 31 enables the floppy disk 43 to be rotated and the head drive control unit 48 to be controlled so that the magnetic head 42 is transported to the queue track position of the floppy disk 43. Accordingly, the magnetic head 42 reproduces the data recorded on this queue track to obtain the reproduced data. The data reproduced from the queue track is input into the control unit 31 via the data reproducing process unit 47 (step A1). Then, a judgement is made whether or not the disk number is contained in the data reproduced from the queue track of the floppy disk 43 under the control of the above-described control unit 31 (step A2).

Then, if no disk number is written into the queue track, only the display of "disk number" is made on the display unit 12 (step A3) and thus, the waiting condition for entry of the disk number is executed (step A4). Under this waiting condition, when a user enters the disk number by the key entry unit 14, this disk number is written into the disk number memory area 53 of the address supervision unit 50 and the queue track of the floppy disk 43 (steps A5 and A6), and the input disk number is displayed on the display unit 12 (step A7). It should be noted that the head address of the empty area in the file name memory area 54 is entered into the disk number memory area 53 of the address supervision unit 50.

In the step A2, on the other hand, if it is detected that the disk number is contained in the data reproduced from the queue track, this disk number is compared with another disk number which has already been recorded on the disk number memory area 53 of the address supervision unit 50. Then, the following control processes are performed. When the file name is designated and also the continuous-exposure mode is set during the recording mode, the address region of the file name memory area 54 to store its file name and the continuous-exposure file number is specified, whereas a retrieval area of the file name memory area 54 is specified when either the file name or continuous-exposure file number is designated (step A8). Then, the control unit 31 energizes the display unit 12 to display the disk number which is read out from the queue track of the floppy disk 43 (step A7).

As has been described in detail, the disk number can be set for the respective disks, and either the file name or continuous-exposure file number which has been set to the still picture to be imaged is supervised based upon its disk number. As a result, the individual track number supervision for a plurality of floppy disks can be achieved based upon the file names

Recording Mode of Electronic Still Video Camera

Figure 5:
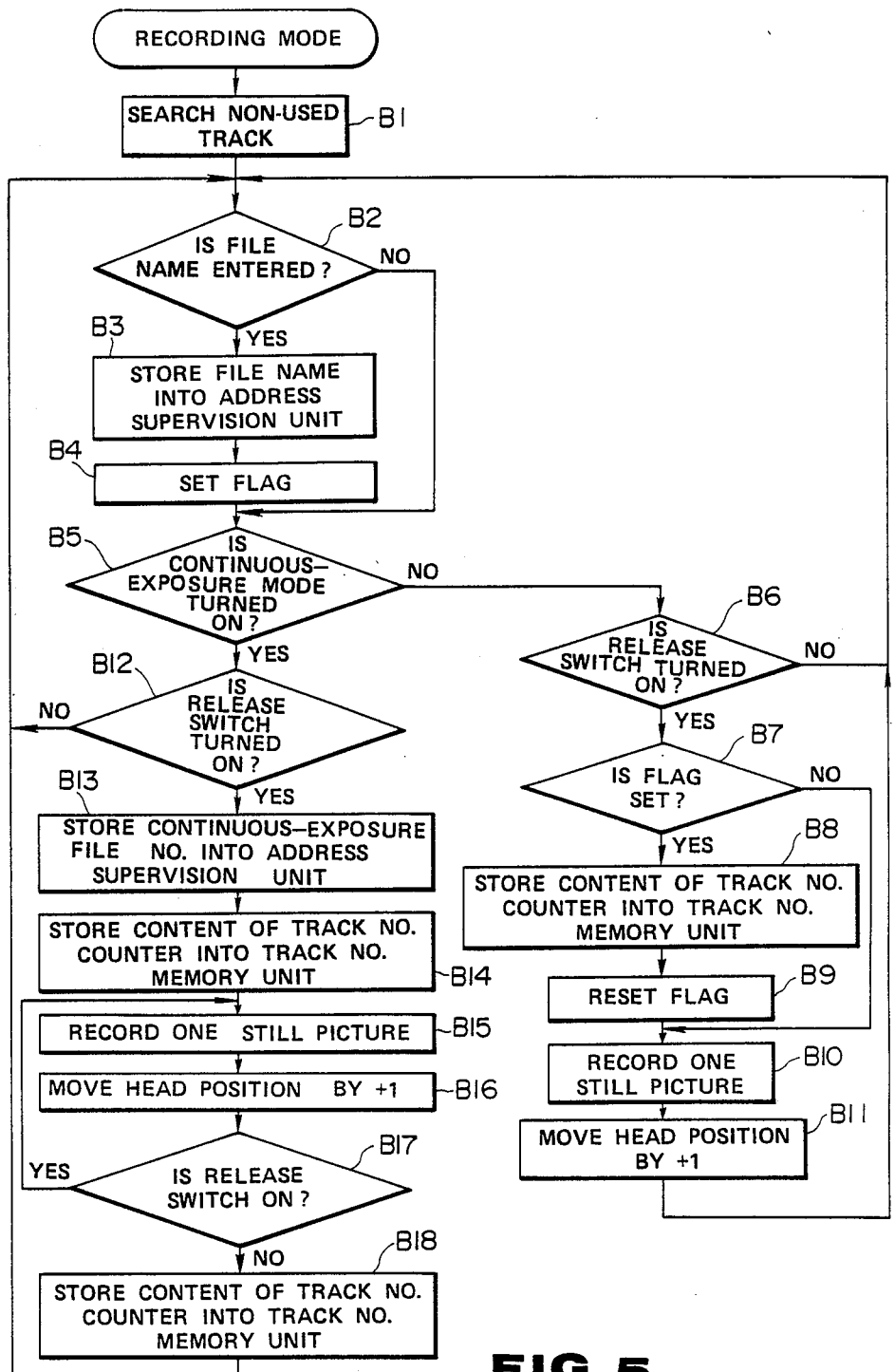
FIG. 5 is a flowchart for explaining a processing operation when the electronic still video camera of FIG. 1 is operated in the recording mode.

Referring now to a flowchart shown in FIG. 5, the recording mode of the electronic still video camera according to the preferred embodiment will be described.

The recording mode is first designated by switching the main mode switch 25 to "REC". Under the control of the head drive control unit 48, the magnetic head 42 successively reproduces the data recorded on the first track of the floppy disk 43 to supply the reproduced signal to the control unit 31. At this stage, the control unit 31 checks whether or not the picture signal is recorded on the track which is being reproduced by the magnetic head 42. If the judgement is made that the picture signal is recorded on this track, the control unit 31 outputs the address updating command to the head drive control unit 48. Conversely, if no picture signal is recorded, then the recording/reproducing switching unit 41 is switched into the recording side. While performing the above-described process, non-used track of the floppy disk 43 can be searched (step B1).

Subsequently, the control unit 31 performs the key sampling operation for the key entry unit 14, and judges whether or not the file name entry is present (step B2). If the file name entry is present, this file name is stored into the file name memory area 54 of the address supervision unit 50 (step B3) and also the flip-flop 61 is set (step B4).

If no file name entry is present in the above-described step B2, otherwise after the control process at the step B4 has been accomplished, the control unit 31 detects the switch condition of the continuous-exposure mode switch 24 so as to judge whether or not the control process corresponds to the continuous-exposure mode (step B5). Then, if the control process is not the continuous-exposure mode, the control unit 31 detects the ON/OFF condition of the release switch 23 (step B6).

When the release switch 23 is not yet operated, the control processes defined in the above-described steps B2 to B6 are repeated.

When the operation of the release switch 23 is detected, a judgement is made whether or not the flip flop 61 is set (step B7). If the flip-flop 61 is set, the content of the track number counter 56 is stored into the track number memory unit 52, and the write address of the track number memory unit 52 is written into the file name memory area 54 of the address supervision unit 50 at this stage (step B8). In this case, the above-described address is recorded on the area corresponding to the file name which has been written in the step B3.

Then the control unit 31 resets the flip-flop 61 (step B9), enables the optical system control unit 33, and imager drive unit 35. Moreover, the imaging process of the still picture is controlled, and the picture signal obtained by this picture imaging is recorded on the floppy disk 43 (step B10).

In the step B7, when the judgement is made that the flip-flop 61 is not yet set, the above-described control processes at the previous steps B8 and B9 are not executed but the imaging record process of the still picture is performed. Thereafter, the control unit 31 outputs the updating command for the head position to the head drive control unit 48 (step B11) and the control process is returned to the step B2.

If, on the other hand, a judgement is made in the previous step B5 that the continuous-exposure mode is selected, the control unit 31 detects the ON-OFF condition of the release switch 23. Then, if the release switch 23 is not yet operated, the control processes executed in the steps B2 to B5 and B12 (B6) are repeated.

To the contrary, when the release switch is operated, the continuous file number is written from the control unit 31 into the file name memory area 54 of the address supervision unit 50 (step B13). Then, the content of the track number counter 56 is stored into the track number memory unit 52, and also the write address of the track number memory unit 52 used at this step is written into the file name memory area 54 of the address supervision unit 50. In the above-described case, this write address of the track number memory unit 52 is written into an area corresponding to the continuous-exposure file number which has been written at the previous step B13 (step B14). The imaging and recording operations of the still picture is carried out under the control of the control unit 31 (step B15), and the head position updating command is given from the control unit 31 to the head drive control unit 48 (step B16), which is similar to the control process executed in the above step B10. Thereafter the ON-OFF condition of the release switch 23 is detected (step B17), and the control processes performed in the steps B15 and B16 are repeated until the release switch 23 is continuously depressed.

If releasing the release switch 23 is detected at the step B17, the control unit 31 enables the content of the track number counter 56 to be stored in the track number memory unit 52, and also enables the write address of the track number memory unit 52 to be stored in the file name memory area 54 of the address supervision unit 50 (step B18), and the control process is returned to the previous step B2.

As previously described in detail, in the electronic still video camera according to the preferred embodiment, when the file name is input during the recording mode, the recording track number of the still picture which has been taken immediately after this file name is entered can be stored, whereas both the track numbers on which the first and final still pictures have been recorded can be stored when the still pictures are taken in the continuous-exposure mode.

Reproduction Mode of Still Pictures

Figure 6:
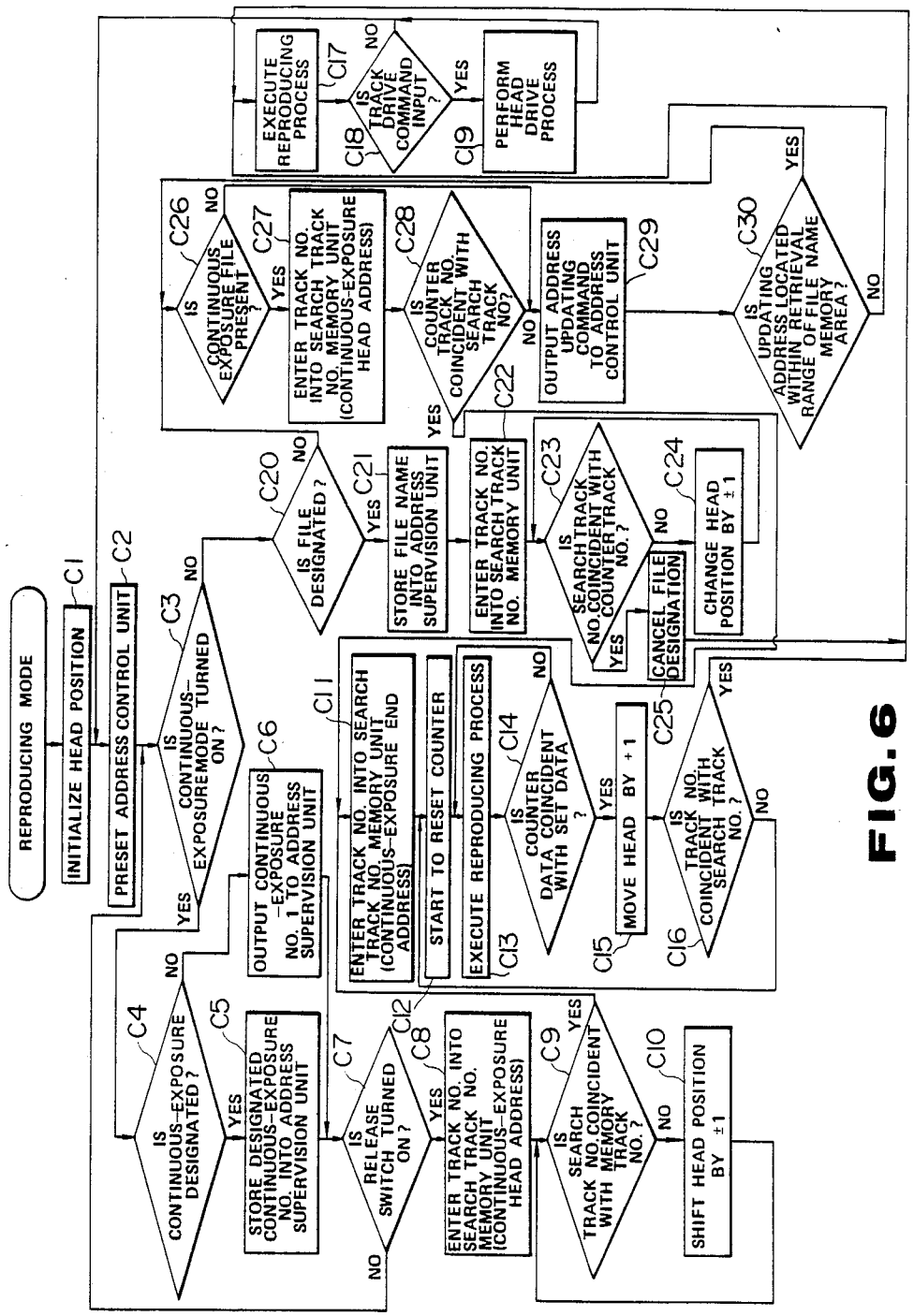
FIG. 6 is a flowchart for explaining a processing operation when the electronic still video camera of FIG. 1 is operated in the reproducing mode; and, FIG. 7 is a schematic block diagram of a circuit arrangement of an electronic still video camera according to a second preferred embodiment of the invention.

The reproduction mode process will now be described with reference to a flowchart shown in FIG. 6.

First, the reproduction mode is designated when the main mode switch 25 is switched to the play position (see FIG. 1). Then, the control unit 31 initializes the position of the magnetic head 42 under the control of the head drive control unit 48. In other words, the magnetic head 42 is set to the position of the first track of the floppy disk 43 (step C1). Under the control of the address control unit 51, the address data is set which has been stored in the disk number memory area 53 of the address supervision unit 50 (step C2). With the above-explained processes, the retrieval range of the file name memory area 54 of the address supervision unit 50 can be defined by the address control unit 51.

Subsequently, the control unit 31 judges whether or not the continuous-exposure mode is selected by detecting the condition of the continuous-exposure mode switch 24 (step C3).

If a judgement is made that the continuous-exposure mode is selected, the control unit 31 performs the sampling operation s as to judge whether or not the continuous-exposure file number is input (step C4). Then, if the continuous-exposure file number is entered, the control unit 31 outputs this entered continuous-exposure file number to the address supervision unit 50 (steps C5). To the contrary, if no continuous-exposure file number is entered, the control unit 31 outputs the continuous-exposure file number "1" to the address supervision unit 50 (step C6).

It should be understood that the above-described address supervision unit 50 inputs the continuous-exposure file number entered from the control unit 31 into the coincident comparator unit 55, and also both the output file name and continuous-exposure file number derived from the file name memory area 54 are successively entered to this coincident comparator unit 55 under the control of the address control unit 51. Then, if the continuous-exposure file number output from the control unit 31 is coincident with the continuous-exposure file output from the file name memory unit 54 in the coincidence comparator unit 55, the coincident signal is output to the address control unit 51. In response to the coincident signal derived from this coincidence comparator unit 55, the address control unit 51 reads the address data for the track number memory unit from the file name memory unit 54 and then sets this data.

Thereafter, the control unit 31 detects the ON-OFF condition of the release switch 23 (step C7) and the control process is returned to the step C3 when the release switch 23 is not yet depressed.

Conversely, if a detection is made that the release switch 23 is depressed, the track number memory unit 52 is addressed under the control of the address control unit 51 based upon the address data set during the control process of the above-described step C5. Also, the track number on which the first recorded still picture data has been recorded in the continuous-exposure mode, is input into the search track number memory unit 57 (step C8). Subsequently, the track number input into the search track number memory unit 57 is compared with the content of the track number counter 56, and then, this comparator unit 58 outputs the head position updating signals ($+1$, $-1$) to the head drive control unit 48 until both the data are coincident with each other (steps C9 and C10).

When a detection is made that the content of the search track number memory unit 57 is coincident with the content of the track number counter 56 in the comparator unit 58, the track number memory unit 52 is again addressed under the control of the address control unit 51, and the track number on which the finally recorded still picture has been recorded during the continuous-exposure mode is input into the search track number memory unit 57 (step C11).

Thereafter, the control unit 31 outputs the continuous reproduction starting signal via the OR-gate 65 so as to reset the counter 64, and in response to the continuous reproduction signal, the clock signal of the clock signal generator unit 66 is supplied via the OR-gate 67 to the above-described counter 64, so that this counter 64 starts its counter operation (step C12) and thus the reproduction process is commenced (step C13).

In the above-described reproducing process, the still pictures which have been recorded on the tracks of the floppy disk 43 corresponding to the magnetic head position that is determined by the control processes of the steps C8 to C10, are reproduced. Then, the reproducing picture signal read out by the magnetic head 42 is transferred to the reproducing signal process unit 44 via the recording/reproducing switching unit 41, and furthermore transferred via the second signal selector 45 to the picture signal reproducing process unit 46 in order to be output as the NTSC type video signal to a TV monitor or other proper appliances.

The above-described reproducing process is continuously performed until a detection by the timer comparator unit 63 is made that the count value of the counter 64 is coincident with the memory content of the set data memory unit 62 which has been previously entered and set by the key entry unit 14 (step C14).

It should be noted that if no timer set data from the key entry unit 14 is entered, a predetermined value supplied from the control unit 31 is entered into the set data memory unit 62.

When, on the other hand, the coincidence between the count value and set data is detected by the timer comparator unit 63, the coincidence signal is output therefrom, whereby the counter 64 is reset and the magnetic head 42 is moved under the control of the head drive control unit 43 (step C15).

Subsequently, the content of the track number counter 56 is compared with the memory content of the search track number memory unit 57 which is stored by performing the control process of the above-described step C11 in the comparator unit 58 (step C16).

If no coincidence is detected by this comparator unit 58, the control processes defined by the steps C12 to C16 are repeatedly performed. That is, every time the memory content of the set data memory unit 62 is coincident with the counter value of the counter 64, the position of the magnetic head 42 is updated, and the still pictures taken in the continuous-exposure mode are continuously reproduced by successively performing the reproduction process.

When the coincidence between the counter content and the memory content is detected in the comparator unit 58, the reproduction is carried out to the track of the floppy disk at which the magnetic head 42 is now positioned (step C17), the key sampling is performed, and then, a judgement is made whether or not entry by the track drive command, for instance, by the cursor/track drive command keys 21 and 22, or the numeral key 15 is executed, and another entry by the search key 17 is performed (step C18).

In this step C18, if the track drive command is input, then the head drive process for the magnetic head 42 is executed in accordance with this command. Thereafter the control process is advanced to the process at the step C2. If, to the contrary, no track drive command is made, the control process is directly advanced to the step C2.

In the previous step C3, if the continuous-exposure mode switch 24 is turned off, a judgement is made whether or not the file name is designated by checking the output from the flip-flop 61 (step C20).

During the control process effected in this step C20, when the file name is entered, this file name is input from the control unit 31 to the coincidence comparator unit 55 in the address supervision unit 50 (step C21).

Under the control of the address control unit 51, the file names are sequentially read out from the file name memory area 54 and sent to the coincidence comparator unit 55, where the above-described entered file name is compared with the readout file name to check coincidence therebetween. If the coincidence is checked in the coincidence comparator unit 55, under the control of the address control unit 51, the address data of the track number memory unit 52 read out from the file name memory area 54, the track number memory unit 52 is addressed in accordance with the readout address data, and subsequently the addressed track number is input into the search track number memory unit 57 (step C22).

Thereafter, in response to the output signal from the comparator unit 58, the head drive control unit 48 controls movement of the magnetic head 42 until the memory content of the search track number memory unit 52 is coincident with the counter content of the track number counter 56 (steps C23, C24).

When the coincidence is judged in the comparator unit 58, the flip-flop 61 is reset to release the designation of the file name, and the reproduction process (step C17) is performed. As a result of the processes executed in the above-described steps C21 to C25, the still picture, the file name of which has been set during the recording mode, can be reproduced by entering this file name into the key entry unit 14.

In the step C20, to contrary, a judgement is made that no file name is designated, the control unit 31 enables the code of the continuous-exposure file to be output to the coincidence comparator 55 under the address control, and then a judgement is made whether or not the continuous-exposure file is present (step C26). Then, if a judgement is made in the above step C26 that the file name data read out from the file name memory area 54 corresponds to the continuous-exposure file and the stored track number memory unit address (i.e., with respect to the track number by which the first taken still picture has been recorded during the continuous-exposure mode) are read out, and the track number memory unit 52 is addressed in accordance with the above-described data so that the recorded track number is input into the search track number memory unit 57 (step C27).

Then, in the comparator 58, the counter content of the track number counter 56 is compared with the memory content of the search track number memory unit 57 (step C28). If there is coincidence, then the control process is advanced to the continuous-exposure reproducing process defined in the steps C11 to C16. Conversely, if there is no coincidence therebetween, the control unit 31 outputs the address updating command for the file name memory area 54 to the address control unit 51 (step C29). At this time, a judgement is made in the address control unit 51 whether or not the address updated in accordance with the above updating command is located within the retrieval range of the file name memory area 54 set in the previous step C2 (step C30). If this updated address is located within the retrieval range, the control process is again returned to the step C26. If this updated address is out of the retrieval range, the still picture which is now recorded on the position of the magnetic head 42.

By executing the processes at the steps C26 to C30, the still pictures can be automatically and continuously reproduced in a case that the first taken still pictures in the continuous-exposure mode have been recorded on the track of the floppy disk by manually operating the search key 17, or cursor/track drive control instruction keys 21 and 22.

As has been described in detail, according to the electronic still video camera of the preferred embodiment, the still pictures which have been taken during the recording mode by the file designation can be simply reproduced by merely entering the file name during the reproducing mode. As a consequence, the easy retrieval for the still pictures recorded on the tracks of the floppy disk is accomplished. When the still pictures are taken in the continuous-exposure mode, the continuous-exposure file is formed. As a result, all of the still pictures taken in the continuous-exposure mode can be automatically and continuously reproduced by during the reproducing mode, either designating the continuous-exposure file, or setting the head position on the first track o which the first still picture has been recorded in the continuous-exposure mode. Consequently, an easy continuous reproduction can be achieved for the still pictures which have been taken in the continuous-exposure mode.

Arrangement of Second Electronic Still Video Camera

Referring now to FIG. 7, an arrangement of an electronic still video camera according to a second preferred embodiment will be described.

It should be noted that since the outer view of this second electronic still video camera is identical to that of the first electronic still video camera as illustrated in FIG. 1, no drawing is made in the specification. Also, the same reference numerals shown in FIG. 2 will be employed as those for denoting the same or similar circuit elements in FIG. 7, and therefore no further explanation thereof is made either.

In the circuit shown in FIG. 7, an address counter 100 is connected to the track number memory unit 52. From the control unit 101, an up-count (increment) instruction signal, a down-count (decrement) instruction signal, a recording mode setting signal and furthermore a release switch operation signal are output to the above-described address counter 100.

The up-count instruction signal is output from the control unit 101 by operating the track drive instruction key 22 after operation of the search key 17 shown in FIG. 1. This instruction signal is supplied, on one hand, to the address counter 100 via the OR-gate 103, and, on the other hand, to the track number memory unit 52 via an OR-gate 103 as a readout signal.

The down-count instruction signal is similarly supplied form the control unit 101 in the reproducing mode after operation of the search key 17 by operating the track drive instruction key 21 in such a way that this instructin signal is supplied to the address counter 100, and also to the track number memory unit 52 via an OR-gate 103 as a readout signal.

The recording mode setting signal is output while the main mode switch 23 (see FIG. 1) is set to the recording mode, and then supplied via a rising-edge type one-shot multivibrator circuit 104 to a set terminal of a flip-flop 105. A set output from this flip-flop 105 is supplied to an AND gate 106. An output derived from this AND gate 106 is supplied as a write signal to the track number memory unit 52, and furthermore to a reset terminal of the flip-flop 105 via a delay circuit 107. In addition, this set output is supplied via an OR-gate 102 to the address counter 100 as the up (+)-count instruction signal.

Then, the above-described release switch signal is output in accordance with the operation of the release switch 23, and supplied to the AND gate 106.

Operations of Second Electronic Still Video Camera

The electronic still video camera according to the second preferred embodiment, illustrated in FIG. 7, is operated as follows.

When the power switch 13 is turned on under the condition that the main mode switch 25 is set to the recording mode, the recording mode setting signal is output from the control unit 101 so as to set the flip-flop 105 via the one-shot multivibrator circuit 104. Similarly, this setting signal is output therefrom in a case that the main mode switch 25 is switched from the other mode to the recording mode while the power switch 13 is turned on. Thereafter, when the electronic still video camera is operated to take pictures by operating the release switch 23, the release switch operating signal is output from the control unit 101 and thus supplied with the AND gate 106 to the track number memory unit 52 as the write signal. Under this condition, the counter value of the track number counter 56 is written into the track number memory unit 52 based upon the address designation by means of the address counter 100.

The output from the AND gate 106 is supplied via the delay circuit 107 and OR-gate 102 to the address counter 100 as the up-count instruction signal in order to update the designated address of the address counter 100. The flip-flop 105 is, on the other hand, reset by the output from the delay circuit 107.

In the second preferred embodiment, after the recording mode is newly set in accordance with the above-described control processes, the track number at which the first taken still picture is recorded can be stored.

In the reproducing mode, when the count value of the address counter 100 is updated by operating the search key 17 and cursor/track drive instruction keys 21 and 22, the track number which has been recorded in the track number memory unit 52 is output to the search track number memory unit 57 in accordance with the updated count value of the address counter 100.

Then, the content of the track number counter 56 is compared with the memory content of the search track number memory unit 57 in the comparator unit 58, that is similar to the comparison operation according to the first preferred embodiment. Based upon the above-described comparison result, the magnetic head 42 is transported in accordance with the resultant signal output from this comparator unit 58. When the coincident comparison result is obtained, transportation of the magnetic head 42 is stopped and fixed to perform the reproducing operation.

In accordance with the electronic still video camera according to the second preferred embodiment, the track number of the floppy disk at which the first taken still picture is recorded is stored after the recording mode is set, whereas this track number is searched in the simple operation so as to reproduce the data designated by this track number during the reproducing mode. Consequently, the search time required for searching the desired still picture ca be shortened.

What is claimed is:

1. An electronic still image processing apparatus comprising:
   housing means;
   release means provided in said housing means, for generating a release signal;
   still image signal producing means provided in said housing means, for producing an electric still image signal from an optical image of an object to be imaged in response to the release signal generated by said release means;
   discrimination data input means provided in said housing means, for inputting discrimination data;

recording means detachably attached to said housing means and having a plurality of recording portions, for recording the electric still image signal generated by said still image signal producing means and the discrimination data input from said discrimination data input means;

still image signal reproducing means provided in said housing means for reproducing the electric still image signal recorded on said recording means;

index data memory means provided in said housing means for storing the discrimination data input from said discrimination data input means and index data representative of said recording portion of said recording means associated with the recorded discrimination data;

discrimination data output means provided in said housing means, for outputting the discrimination data recorded on said recording means;

index data output means provided in said housing means, for outputting the index data stored in said index data memory means, which is associated with the discrimination data output from said recording means by said discrimination data output means;

control means provided in said housing means, for controlling said still image reproducing means in response to the index data output from said index data memory means by said index data output means, so as to reproduce the electric still image signal recorded on the recording portion of which the index data is representative.

2. An electronic still image recording apparatus as claimed in claim 1, further comprising:

mode changing means provided in said housing means, for changing at least a recording mode and other modes and for setting the changed mode; and memory control means provided in said housing means, for writing into said index data memory means, the index data representative of the portion of the recording means on which the electric still image signals have been recorded just after the recording mode is set by said mode changing means.

3. An electronic still image processing apparatus as claimed in claim 1, further comprising:

continuous-exposure means provided in said housing means, for controlling said still image signal producing means to be intermittently operated only during a predefined time period while said release signal is output from said release means; and memory control means for writing the index data representative of the recording portions of said recording means where the electric still image signals produced at first and last instants have been recorded, into said index data memory means in response to the operation of said continuous-exposure means.

4. An electronic still image processing apparatus as claimed in claim 3, wherein said control means includes means for controlling said reproducing means in such a manner that a plurality of electric still image signals which have been recorded on two portions of said recording means on the basis of two pieces of said index data stored in said index data memory means, are continuously and successively reproduced every predetermined time.

5. An electronic still image processing apparatus as claimed in claim 4, wherein said control means includes:

reproduction starting portion setting means for setting a portion of said recording means reproduced by said reproducing means based upon the index data which is representative of the portion of said recording means on which the electric still image signal produced at first instant has been recorded;

timer means for counting a predetermined time;

reproduction portion updating means for updating the portion of said recording means reproduced by said reproducing means every time the counting operation by said timer means is completed; and reproduction ending portion detecting means for detecting whether or not the portion of said recording means which is reproduced by said reproducing means is equal to a portion corresponding to the index data which is representative of the portion of the recording means on which the still image signal produced at last instant has been recorded.

6. An electronic still image processing apparatus as claimed in claim 5, wherein said timer means is capable of arbitrarily setting the counting time.

7. An electronic still image processing apparatus as claimed in claim 4, wherein said control means includes:

reproduction portion detecting means for detecting whether or not a portion of said recording means reproduced by said reproducing means is equal to a portion corresponding to the index data which is representative of the portion of said recording means on which said still image signal produced at first instant has been recorded;

timer means for counting a predetermined time;

reproduction portion updating means for updating said portion reproduced by said reproducing means every time the counting operation by said timer means is completed; and reproduction portion ending detecting means for detecting the portion of said recording means reproduced by said reproducing means is equal to a portion corresponding to the index data which represents the portion of said recording means on which the still image signal produced at last instant has been recorded.

8. An electronic still image processing apparatus as claimed in claim 1, further comprising:

file name input means provided in said housing means, for inputting a file name;

wherein said index data memory means includes means for storing the file name associated with the discrimination data.

9. An electronic still image processing apparatus as claimed in claim 8, further comprising:

memory control means provided in said housing means for controlling storing of data into said index data memory means, and for storing the index data indicating the recording portion of said recording means on which the still image signal was recorded for the first time after the file name was input into said index memory means.

10. An electronic still image processing apparatus as claimed in claim 4, wherein said index data output means includes means for controlling the outputting of said index data memory means and for outputting the index data stored in said index memory means, which is associated with the file name input from said file name input means during the reproducing operation of said still image reproducing means.

11. An electronic still image processing apparatus as claimed in claim 10, wherein said recording means is a floppy disc having a plurality of recording tracks for recording said still image signals;
- said index data memory means stores index data representative of a portion of said recording track of the floppy disc;
- said still image signal reproducing means includes a magnetic head; and
- said control means includes means for controlling a head position of said magnetic head with respect to the track of the floppy disc in response to said index data stored in said index data memory means.

12. An electronic still image processing apparatus as claimed in claim 11, further including
- detecting means provided in said housing means, for detecting said head position of said magnetic head on said floppy disc and for outputting a detection result indicative of the head position to said index data memory means.

13. An electronic still image processing apparatus as claimed in claim 10, wherein said index data memory means includes:
- index data storage means for storing the index data;
- first supervision memory means for storing both the file name input from said file name input means and address data representative of a storage portion of said index data storage means into which said index data stored in accordance with its associated file name has been stored; and
- said index data output means includes:
- first coincidence detecting means for detecting coincidence between the file name input from said file name input means during the reproducing operation of said reproducing means and the file name stored in said first supervision memory means; and
- designating means for designating the storage portion of said index data storage means to output the index data based upon the address data which has been stored in said supervision memory means in relation to the file name detected by said first coincidence detecting means.

14. An electronic still image processing apparatus as claimed in claim 13, wherein said index data memory means includes;
- second supervision memory means for storing therein both said discrimination data input from said discrimination data input means and said file name which has been input with respect to said recording means recording said discrimination data;
- said index data output means includes:
- second coincidence detecting means for detecting coincidence established between the discrimination data stored in said second supervision memory means and that output from said recording means by said discrimination data output means; and
- means for outputting only said file name to said first coincidence detecting means, said file name corresponding to said second coincidence detecting means.

* * * * *